United States Patent [19]
Tanaka et al.

[11] Patent Number: 5,634,333
[45] Date of Patent: Jun. 3, 1997

[54] EXHAUST PIPE OPENING AND CLOSING APPARATUS

[75] Inventors: Masakazu Tanaka, Okazaki; Hiroyuki Usami, Kariya; Mamoru Mabuchi, Kariya; Tatsuo Sakai, Kariya; Kinji Hodaira, Okazaki, all of Japan

[73] Assignee: Nippondenso Co., Ltd., Kariya, Japan

[21] Appl. No.: 524,941

[22] Filed: Sep. 8, 1995

[30] Foreign Application Priority Data

| Sep. 9, 1994 | [JP] | Japan | 6-216401 |
| Apr. 26, 1995 | [JP] | Japan | 7-101942 |

[51] Int. Cl.⁶ ............................ F01N 3/00; F01N 3/10
[52] U.S. Cl. .................................... 60/287; 60/300
[58] Field of Search ......................... 60/284, 287, 300, 60/303

[56] References Cited

U.S. PATENT DOCUMENTS

| 3,945,802 | 3/1976 | Eckert | 60/284 X |
| 4,373,330 | 2/1983 | Stark | 60/300 X |
| 4,520,624 | 6/1985 | Kiyota et al. | 60/303 X |
| 4,862,689 | 9/1989 | Duret | 60/284 X |
| 5,063,737 | 11/1991 | Lopez-Crevillen et al. | 60/303 X |
| 5,264,186 | 11/1993 | Harada et al. | |
| 5,384,098 | 1/1995 | Morikawa | 60/287 X |
| 5,467,594 | 11/1995 | Aoki et al. | 60/284 X |

FOREIGN PATENT DOCUMENTS

| 0588315 | 3/1994 | European Pat. Off. | |
| 0145813 | 11/1979 | Japan | 60/300 |
| 460108 | 2/1992 | Japan | |

OTHER PUBLICATIONS

U.S. application S.N. 08/507949, USAMI et al, filing date: Jul. 27, 1995.

*Primary Examiner*—Hoang Nguyen
*Attorney, Agent, or Firm*—Cushman, Darby & Cushman IP Group of Pillsbury Madison & Sutro LLP

[57] ABSTRACT

In an automotive engine exhaust pipe having a main flow passage and a bypass flow passage, the exhaust gas flows through the bypass flow passage having an heater-provided catalyst when an engine starts. After a main catalyst reaches a catalytic activation temperature, a switching valve switches the exhaust gas to flow through the main flow passage. The main shaft is divided into a driven shaft inserted into a bearing hole and a driving shaft inserted into another bearing hole, and therefore, a total length thereof in an axial direction is shorter than a length of the main shaft without having segments. Therefore, even though the driven shaft and the driving shaft are deformed into the arch shape, a deformation amount thereof is reduced so that inner peripheries of the bearing holes are not rubbed against the shafts. Since the driving shaft is smaller in diameter than the driven shaft, even though a cross section of the driving shaft is elliptically strained, the inner periphery of the bearing hole is not rubbed against the driving shaft. As a result, since a clearance between the driving shaft and the bearing hole can be narrowed, the exhaust gas from the clearance can be prevented from leaking.

12 Claims, 10 Drawing Sheets

EXHAUST PIPE OPENING AND CLOSING APPARATUS

CROSS REFERENCE TO RELATED APPLICATIONS

This application is based on and claims priority of Japanese Patent Applications No. 6-216401 filed Sep. 9, 1994 and No. 7-101942 filed Apr. 26, 1995, the contents of which are incorporated herein by reference.

BACKGROUND OF THE INVENTION

1. Field of the Invention

The present invention generally relates to an exhaust pipe opening and closing apparatus. More particularly, the present invention relates to the exhaust pipe opening and closing apparatus which selectively opens and closes a main flow passage of the exhaust pipe and a bypass flow passage branching from the main flow passage.

2. Description of the Related Art

In a system for purifying exhaust gas emitted from an automotive engine, a catalytic conversion system in which a carrier carrying a noble metal such as platinum, rhodium or the like as a catalyst is provided in an exhaust pipe and purifies HC, CO and NOx or the like in the exhaust gas by oxidation or oxidation and reduction reaction.

In the catalytic conversion system, the catalyst needs to be heated up to a catalytic activation temperature of, for example, 300° to 400° C. or more. However, in general, since a catalytic heating method with exhaust gas is used, the catalyst does not reach the catalytic activation temperature, and therefore little exhaust gas can be purified.

In order to heat up the catalyst to the catalytic activation temperature as early as possible, the catalyst is disposed next to an automotive engine so as to be exposed to the exhaust gas therefrom, a material used for the carrier carrying the catalyst is changed from ceramics to a metal having a high heat conductivity, or a heater is installed at the carrier so as to be heated forcibly.

In order to restrict the exhaust gas from automobiles, purification ratio of toxic gas components such as HC, CO and NOx needs to be improved more. Therefore, the catalyst is disposed at a position close to the engine so that the exhaust gas can be purified just after the engine is started. However, when the catalyst is provided close to the engine, the catalyst is exposed to the exhaust gas with high temperature. Since the catalyst is generally decayed early at high temperature, the purification ratio is lowered.

As disclosed in the Japanese Patent Application Laid-Open No. 4-60108, the exhaust pipe is diverged into two parts near the engine to form a main flow passage and a bypass flow passage. A main catalyst is disposed on the downstream side of a portion in which the bypass flow passage joins the main flow passages again, and a heater-provided catalyst is disposed at the bypass flow passage. A switching valve (opening and closing device) of a rotatably movable type is provided at a branch portion of the exhaust pipe near the engine. When the exhaust gas is at a low temperature immediately after the start of the engine, the main flow passage is closed and the bypass flow passage is opened, and thereby the exhaust gas is flowed into the bypass flow passage and purified by the heater-provided catalyst quickly heated up to the catalytic activation temperature. After the exhaust gas is heated up and the main catalyst is sufficiently heated by the exhaust gas, the bypass flow passage is closed and the main flow passage is opened by the switching valve, and therefore, the exhaust gas is flowed into the main flow passage and purified by the main catalyst.

The switching valve provided in the exhaust pipe and exposed to the exhaust gas with high temperature needs to have a sufficient heat resistance. Particularly, a main shaft of the switching valve is deformed into an arch shape in an axial direction by being exposed to high temperature and a cross section of the switching valve is strained into an elliptic shape. Thus, the main shaft inserted into a bearing hole is deformed into the arch shape. Hence, a middle portion of the main shaft contacts an inner periphery of the bearing hole in addition to having two ends of the main shaft supported and therefore, what is called "prize" is produced. Or the cross section of the main shaft is strained into the elliptic shape, the main shaft forcibly contacts the inner periphery of the bearing hole. Therefore, what is called "prize" is produced. As a result, the smooth operation of the main shaft is disturbed. Then, the opening and closing operation of the switching valve is no longer performed completely. When the switching valve closes the main flow passage and closes the bypass flow passage, the opening and closing operation is incomplete. Therefore, the exhaust gas leaks into the main flow passage and is discharged into an atmosphere without being purified by the heater-provided catalyst.

Furthermore, in order to connect the main shaft to an external driving device, the main shaft is constructed so as to protrude outward from the exhaust pipe through the bearing hole. At that time, since the main shaft may be deformed and strained at high temperature, a wide clearance needs to be made between the bearing hole and the main shaft. Thus, the exhaust gas leaks into the atmosphere through the clearance. When the clearance is made to narrower, the main shaft has malfunction or the like due to a small deformation or a small strain.

SUMMARY OF THE INVENTION

In view of the foregoing problems of the prior art in mind, it is a primary purpose of the present invention to provide an exhaust pipe opening and closing apparatus which can prevent the leak of the exhaust gas through the clearance between the main shaft and the hole into which the main shaft has been inserted without causing any malfunction to the main shaft.

In one preferred mode of the present invention to solve the above objective, the exhaust pipe opening and closing apparatus is provided in an exhaust pipe of an automotive engine having a main flow passage and a bypass flow passage, the exhaust pipe of opening and closing apparatus is driven by an external driving equipment provided on an outside of the exhaust pipe and selectively opening and closing the main flow passage and said bypass flow passage. The exhaust pipe opening and closing apparatus includes a main shaft rotatably supported and reciprocatively rotated by the external driving equipment. One end portion of the main shaft projects outwardly from the exhaust pipe to the external driving equipment and is connected to the external driving equipment. The exhaust pipe opening and closing apparatus includes an opening and closing member provided on the main shaft and selectively opening and closing the main flow passage and the bypass flow passage corresponding to the reciprocative rotation of the main shaft. The main shaft is divided into a plurality of segments in an axial direction.

Preferably, the main shaft is divided into two segments composed of a driving shaft projected outwardly from the exhaust pipe and connected to the external driving equipment and a driven shaft positioned inside of the exhaust pipe, and the exhaust pipe opening and closing apparatus has a clearance between the driving shaft and an inner periphery of a hole into which the driving shaft is inserted, and the clearance is set to be narrower than a clearance between the driven shaft and an inner periphery of a hole into which the driven shaft is inserted.

According to the means stated above, as the main shaft is axially divided into a plurality of segments, each shaft segment is axially shorter than the non-divided main shaft. Accordingly, even if each shaft segment is deformed into an arch shape, the deformation amount is substantially smaller than the deformation amount of the non-divided main shaft. Particularly, the shaft segment whose entirety is disposed within the exhaust pipe is easily deformed by the high heat of the exhaust gas. However, as the main shaft is divided, the deformation of such shaft segment can be absorbed by the displacement of the axial center. Furthermore, the axial length, the radial dimension, the material, etc. can freely be set, particularly for the shaft segment projected to the outside from the exhaust pipe, the operational ill condition can be prevented by the control of the arched deformation amount and the cross sectional elliptical strain not to be so large on one hand, and the leakage of the exhaust gas can be reduced by the narrowing of the clearance between such shaft segment and the inner periphery of the hole is set to be small.

According to the means stated above, the clearance between the driving shaft projected to the outside from the exhaust pipe and the inner periphery of the hole into which the driving shaft is to be inserted is set to be narrow. Accordingly, the leakage of the exhaust gas can be restrained to be extremely small. Even if the driving shaft is arranged as above, unlike the driven shaft whose entirety is disposed within the exhaust pipe, the degree of being directly exposed to the exhaust gas is so small that the deformation and strain thereof are small and therefore there is no possibility of operational ill condition.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF THE PRESENTLY PREFERRED EXEMPLARY EMBODIMENTS

The preferred embodiments of the present invention are hereinafter described with reference to the accompanying drawings.

A first embodiment of the present invention applied to a catalytic conversion system for an automotive exhaust gas purification will now be described referring to FIGS. 1 through 4.

Figure 4:
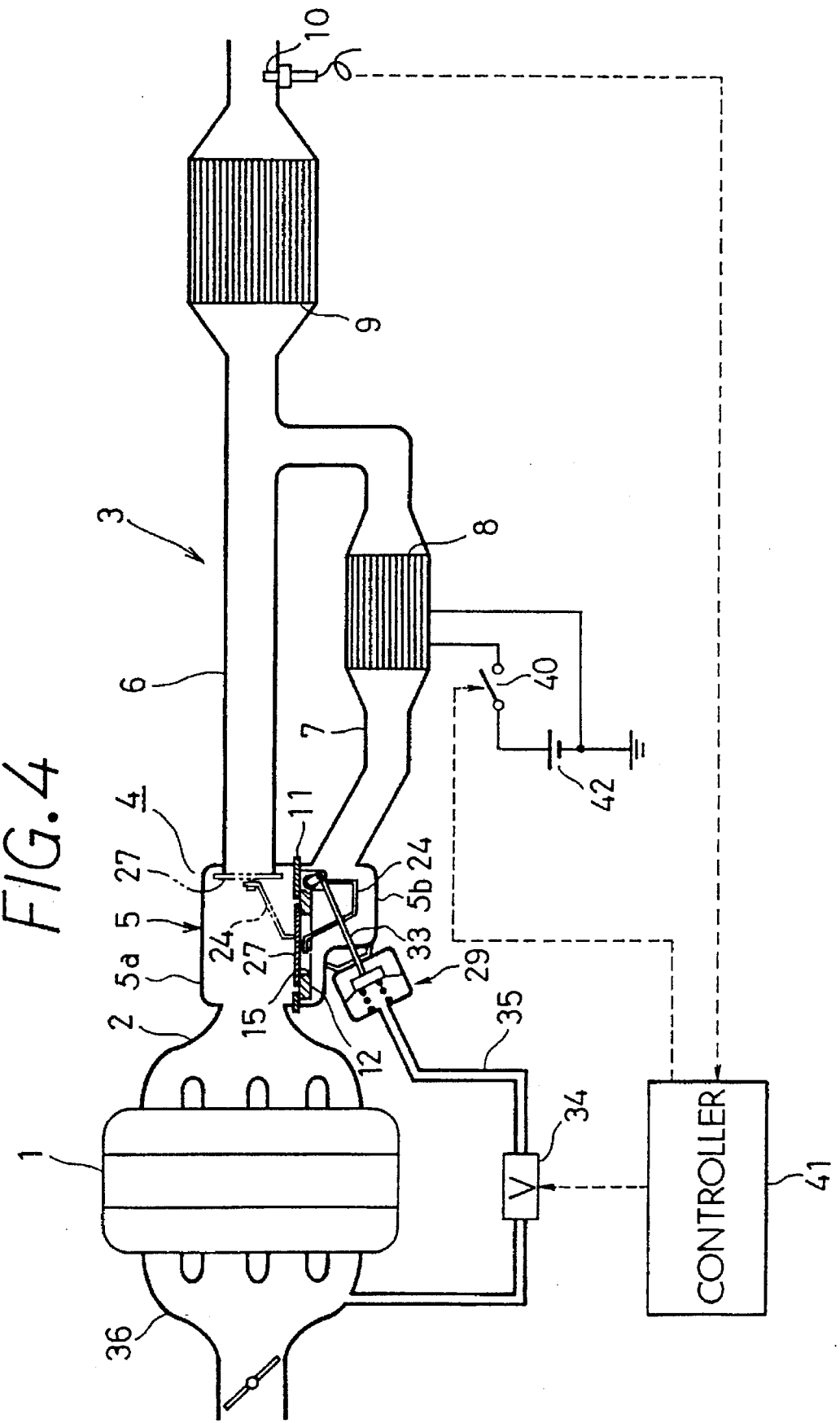
FIG. 4 is a view illustrating a construction of an exhaust gas purification system.

In FIG. 4 illustrating an entire construction of a catalytic conversion system, an exhaust pipe 3 is connected to an exhaust manifold 2 of an engine 1, and exhaust gas from the engine 1 is discharged into an atmosphere through the exhaust pipe 3.

A connected portion between the exhaust pipe 3 and the exhaust manifold 2 is constructed as a casing 5 of a switching valve 4 as an opening and closing system according to the present invention. The casing 5 is made of a metal having one inlet connected to the exhaust manifold 2 and two outlets. A main exhaust pipe 6 including a main flow passage of the exhaust pipe 3 is connected to one outlet and a bypass pipe 7 including a bypass flow passage of the exhaust pipe 3 is connected to the other outlet. A tip of the bypass pipe 7 branching from the main exhaust pipe 6 is reconnected to the main exhaust pipe 6. In the middle portion of the bypass pipe 7, a heater-provided catalyst 8 as a preactive catalyst carrying, for example, a noble metal such as platinum, rhodium or the like on its honeycomb-shaped heater is held. At a downstream side of the main exhaust pipe 6 from the junction with the bypass pipe 7, a main catalyst 9 carrying the noble metal such as platinum, rhodium or the like on the honeycomb-shaped carrier is held.

The switching valve 4, as described later, closes the main exhaust pipe 6 and opens the bypass pipe 7 when the exhaust gas is at low temperature immediately after the engine 1 is started. Further, the switching valve 4 closes the bypass pipe 7 and close the main exhaust pipe 6 after the main catalyst 9 is heated up to the catalytic activation temperature by the exhaust gas. In order to determine timing of the opening and closing operation of the switching valve 4, a temperature sensor 10 is provided so as to monitor a condition of the catalytic activation of the main catalyst 9 by temperatures of the exhaust gas after passing through the main catalyst 9 in the main exhaust pipe 6.

Figure 1:
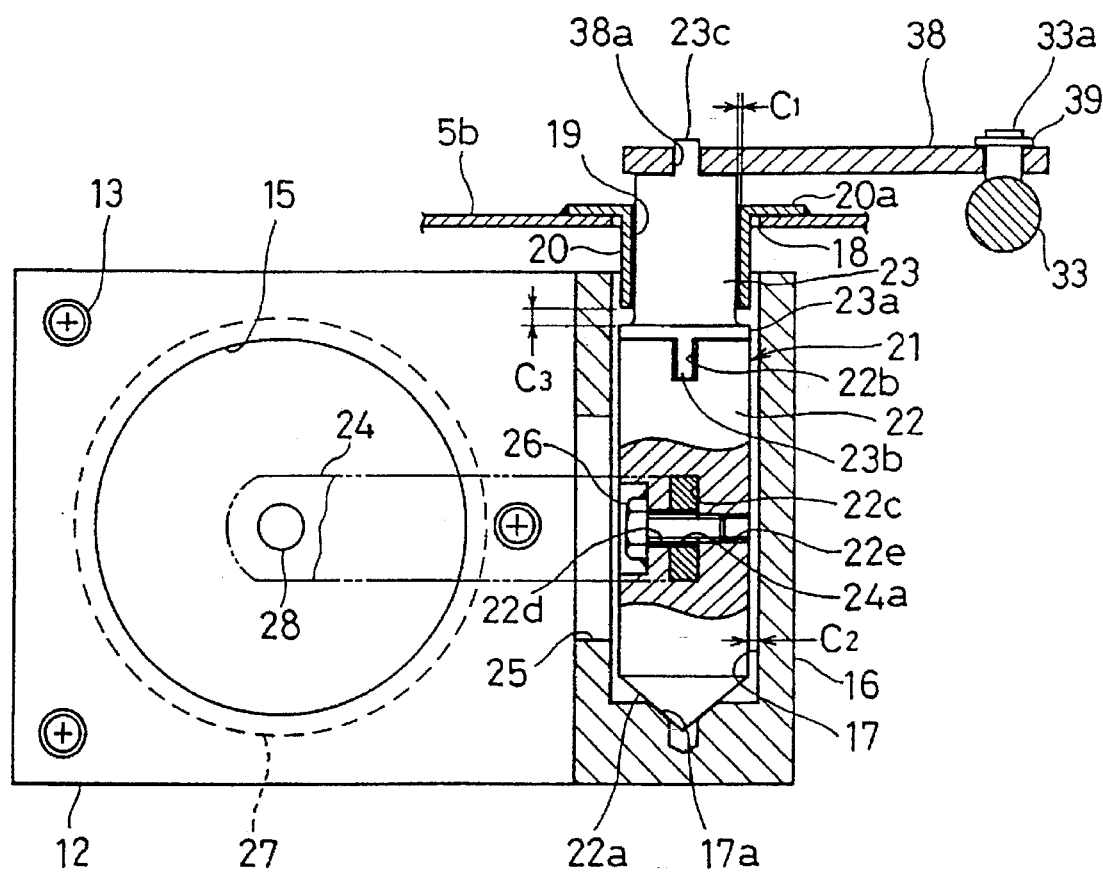
FIG. 1 is a vertical cross-sectional front view illustrating an main portion of a first embodiment according to the present invention.
Figure 2:
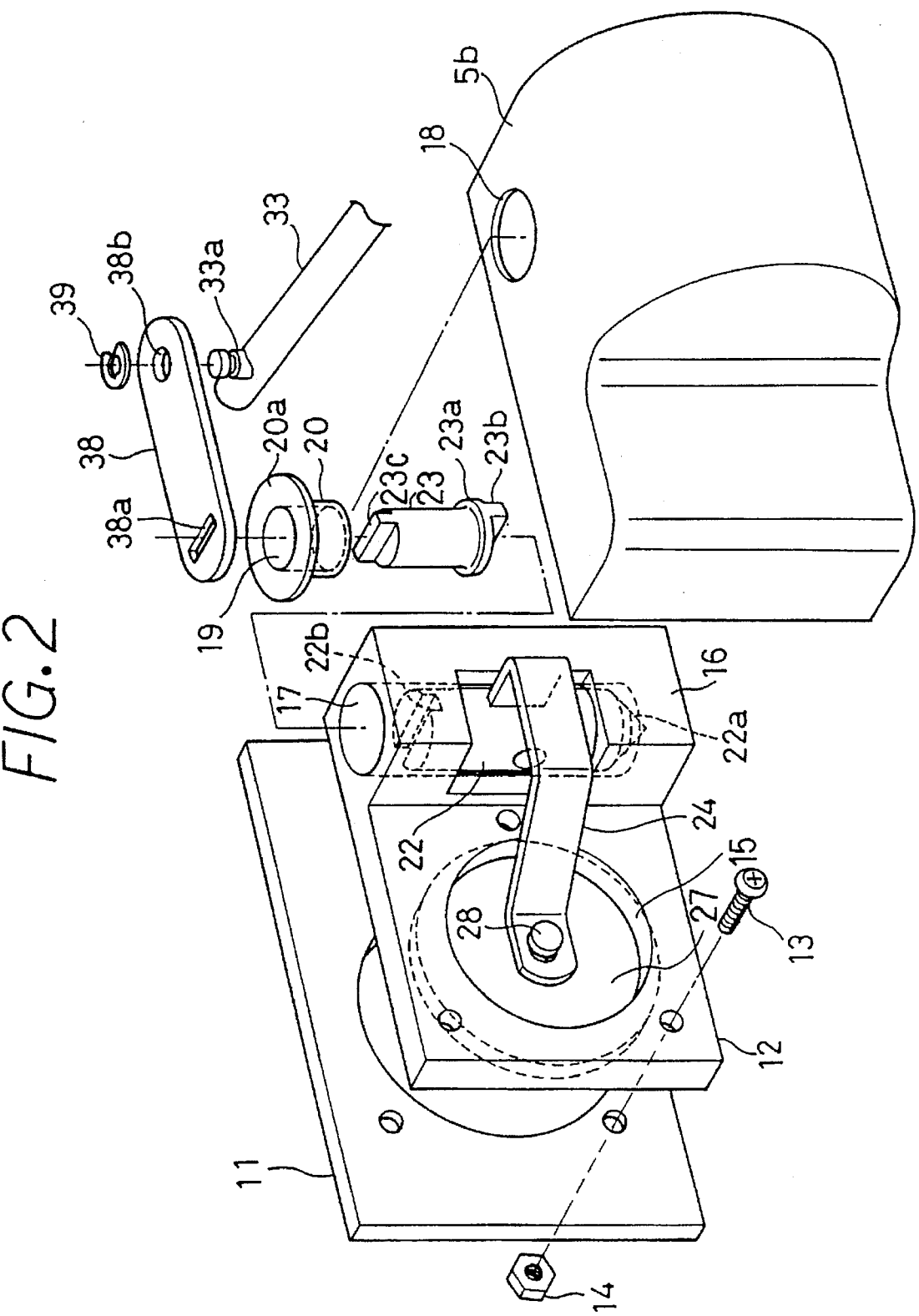
FIG. 2 is an exploded perspective view illustrating the main portion.
Figure 3:
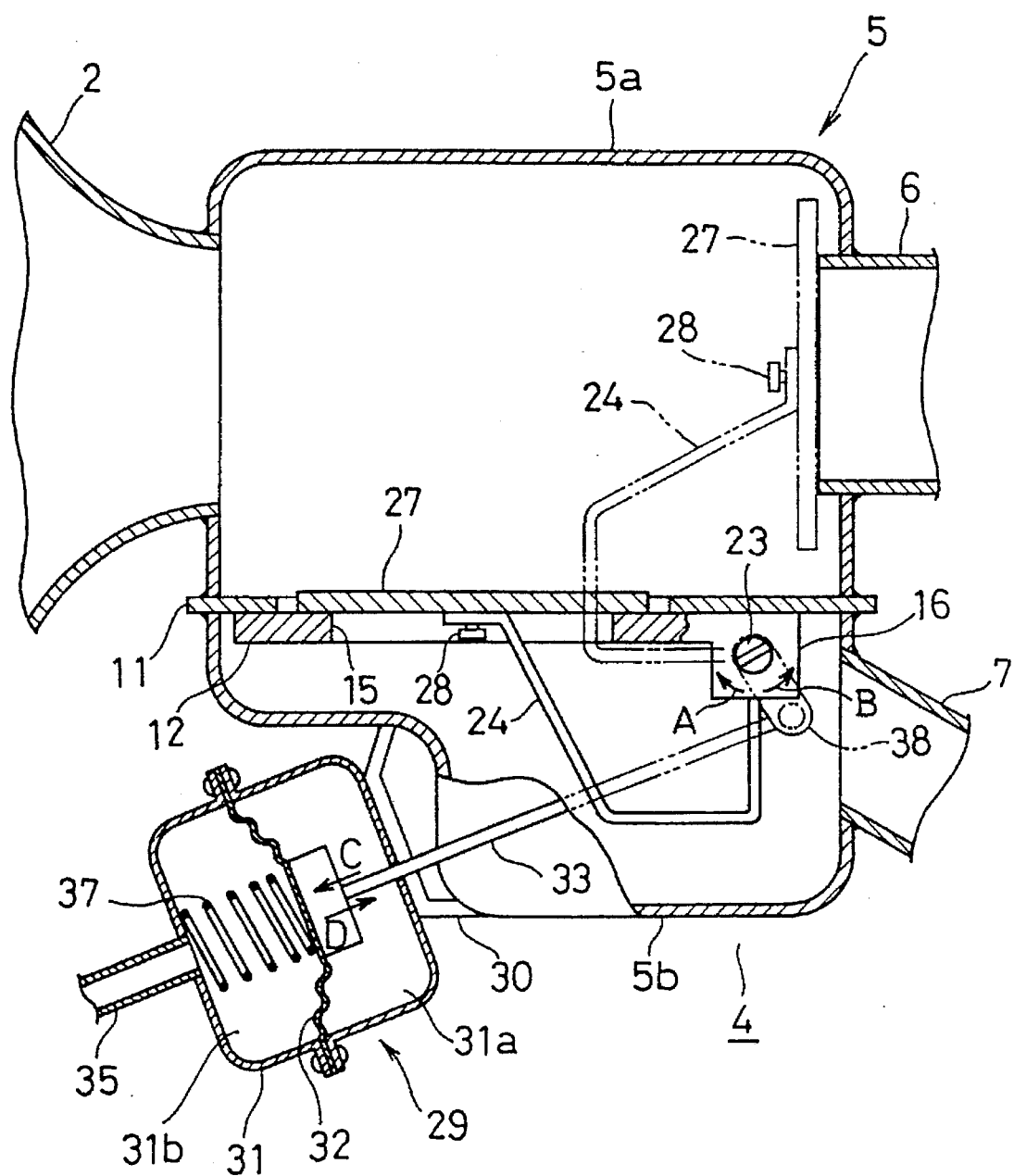
FIG. 3 is a horizontal cross-sectional view illustrating the main portion.

A specific construction of the switching valve 4 will be explained with reference to FIGS. 1 through 3. The casing 5 includes a main casing portion 5a having an inlet connected to the exhaust manifold 2 and an outlet connected to the main exhaust pipe 6 and a casing cover 5b having an outlet connected to the bypass pipe 7. The main casing portion 5a and the casing cover 5b are connected by welding with a frame plate 11 disposed therebetween. On a side surface at a side of the casing cover 5b of the frame plate 11, a seat plate 12 of the switching valve 4 is fixed with bolts 13 and nuts 14.

In the seat plate 12, a circular ventilation hole 15 for communicating the bypass pipe 7 with the exhaust manifold 2 through the main casing portion 5a is formed. At a side portion of the seat panel 12, a square cylindrical housing 16 as a bearing is integrally formed and projected. At the housing 16, a bearing hole 17 with a circular base and an opened top is formed. On the upper surface portion of the casing cover 5b, a circular hole 18 positioned right above the bearing hole 17 is formed. A sleeve 20 made of a metal such as a stainless steel is fitted into the circular hole 18 as a receiving member, specifically a bearing. A bearing hole 19 opens an up-and-down direction of the sleeve 20. The lower end portion of the sleeve 20 is inserted into the bearing hole 17 of the housing 16. The sleeve 20 has a large-diameter flange portion 20a on the upper end portion thereof. The flange portion 20a is fixed at the casing cover 5b by welding so as to close the circular hole 18.

A main shaft 21 of the switching valve 4 is inserted into the bearing hole 17 of the housing 16 and the bearing hole 19 of the sleeve 20. The main shaft 21 is divided into two segments in the axial direction. The lower shaft segment is a driven shaft 22 and the upper shaft segment is a driving shaft 23. The driven shaft 22 is inserted into the bearing hole 17 of the housing 16 and supported therein. The lower end portion of the driven shaft 22 is formed into a convex circular cone 22a. The convex circular cone 22a is received by the concave circular cone 17a formed on the bottom surface of the bearing hole 17 so that a thrust load acting on the main shaft 21 entirely can be received by the concave circular cone 22a. The driving shaft 23 is inserted into the bearing hole 19 of the sleeve 20 so as to be positioned on the driven shaft 22. An upper end portion of the driving shaft 23 is projected to the outside from the bearing hole 19 of the sleeve 20 so as to be connected to an external driving equipment.

In order to prevent the driven shaft 22 and driving shaft 23 from slipping off from the sleeve 20, a flange portion 23a having a larger diameter than the sleeve 20 is formed on the lower end portion of the driving shaft 23 projecting downward from the sleeve 20. The flange portion 23a is engaged at the lower end of the sleeve 20 so as to be a stopper for the driven shaft 22 and the driving shaft 23. Furthermore, in order to transmit the rotational force, given from the external driving equipment to the driving shaft 23, to the driven shaft 22, a rib projection 23b formed so as to project on the lower surface portion of the flange portion 23a of the driving shaft 23 is engaged to a slot 22b formed on the upper end surface of the driven shaft 22. The width of the slot 22b is designed to be wider than the width of the rib projection 23b. Even though the slot 22b is deformed into an arch shape, the axial center displacement between the driven shaft 22 and the driving shaft 23 is not produced.

Both the driven shaft 22 and the driving shaft 23 are made of a heat resistant material such as stainless steel. A clearance C1 between the driving shaft 23 and an inner periphery of the bearing hole 19 in which the driven shaft 22 and the driving shaft 23 are inserted is set to be smaller than a clearance C2 between the driven shaft 22 and an inner periphery of the bearing hole 17 of the housing 16 in which the driven shaft 22 is inserted. The clearance C1 is set to be as small as possible so as to prevent a leak of exhaust gas therefrom. Further, a length (length of a seal) of the sleeve 20 in the axial direction is set to be relatively large so as to improve a seal effect by the small clearance C1. Furthermore, between the flange portion 23a of the driving shaft 23 and the lower end of the sleeve 20, a small clearance C3 is set. The driven shaft 22 and the driving shaft 23 can be movable in the axial direction by the clearance C3.

An arm 24 is provided at the driven shaft 22. In order to allow the arm 24 to move rotatably with corresponding to a rotation of the driven shaft 22, a window 25 is openly made at the housing 16.

Assembling the arm 24 of the driven shaft 22 is explained. At the driven shaft 22, a mounting hole 22c is formed. At one side of the mounting hole 22c, a stepped hole 22d is formed and at the other side thereof, a tapped hole 22e is formed. A base end portion of the arm 24 is engaged to the mounting hole 22c. A bolt 26 is penetrated in a through hole 24a formed at the base end portion of a stepped hole 22d and the arm 24 so that the bolt 26 is fastened spirally in a tapped hole 22e. In order to prevent the bolt 26 from slipping off, the bolt 26 is welded to the driven shaft 22.

A tip end portion of the arm 24 is extended to a ventilation hole 15 of the seat plate 12. On the tip end portion, a circular opening and closing plate 27 as an opening and closing member disposed inside the main casing portion 5a is assembled inclinably by a stepped screw 28 as an assembly member. When the driven shaft 22 rotates in a direction indicated by an arrow A, the arm 24 rotates in the same direction. As shown with two-dotted line in FIG. 3, the opening and closing plate 27 contacts an end surface of the main exhaust pipe 6 and the main exhaust pipe 6 is closed. When the driven shaft 22 rotates in a direction indicated by an arrow B opposing to the arrow A, the arm 24 rotates in the same direction. As shown with a full line in FIG. 3, the opening and closing plate 27 contacts a seat plate 12 and the ventilation hole 15 and the bypass pipe 7 are closed. Since the opening and closing plate 27 is inclinable against the arm 24, the opening and closing plate 27 contacts a whole periphery of an end surface of the main exhaust pipe 6 and a whole periphery portion of the ventilation hole 15 without any clearance therebetween.

As the external driving equipment for driving the driving shaft 23, a diaphragm actuator 29 is mounted on an outer side of the casing cover 5b through a stay 30. The diaphragm 29 has a spring-back type diaphragm 32 installed inside a casing 31 and the diaphragm 32 is directly connected to an operating shaft 33 as an operating member. A chamber 31a divided by the diaphragm 32 inside the casing 31 is communicated with air and as shown in FIG. 4, a chamber 31b is connected to an intake manifold 36 of the engine 1 through an intake pipe 35 having a solenoid valve 34 as an opening and closing means. When the solenoid valve 34 opens, since the pressure inside the chamber 31b is negative due to a suction of the intake manifold 36, the diaphragm 32 displaces in a direction as indicated by an arrow C against a resilient force of a compression spring 37. Alternately, when the solenoid valve 34 closes, the diaphragm 32 displaced in a direction indicated by an arrow D in opposition to the direction indicated by the arrow C due to the resilient force of the compression spring 37.

By the displacement of the diaphragm 32 in the directions indicated by the arrows C and D, the operation shaft 33 reciprocates in the same direction as the diaphragm 32. In order to transmit a linear movement of the operation shaft 33 by converting the linear movement into a rotational movement of the driving shaft 23, a link 38 for constructing a crank mechanism is mounted on an upper end portion of the driving shaft 23. The link 38 has a square hole 38a fitting on the rib-shaped projection 23c projecting on the upper end portion of the driving shaft 23. At a circular hole 38b formed on the other end portion of the link 38, a connecting pin 33a projecting from a tip end portion of the operation shaft 33 is rotatably mounted. Additionally, a stop ring 39 is assembled at the tip end portion of the connecting pin 33a projecting from the circular hole 38b so as to prevent the detachment of the link 38.

The relation between the movement direction of the operating shaft 33 by the opening and closing operation of the solenoid valve 34 and the rotational direction of the driving shaft 23 (driven shaft 22) is described. When the solenoid valve 34 closes and subsequently the operation shaft 33 is moved in the direction indicated by the arrow C, the driving shaft 23 rotates in the direction indicated by the arrow A. Therefore, the opening and closing plate 27 opens the bypass pipe 7 and closes the main exhaust pipe 6. In this state, when the solenoid valve 34 closes and subsequently the operation shaft 33 is moved in the direction indicated by the arrow D, the driving shaft 23 rotates in the direction indicated by the arrow B, and therefore, the opening and closing plate 27 opens the main exhaust pipe 6 and closes the bypass pipe 7.

As shown in FIG. 4, a switch 40 for intermitting a heater of the heater-provided catalyst 8 and the solenoid valve 34 are controlled by an electronic controller 41. The electronic controller 41 obtains an output signal from the temperature sensor 10. The electronic controller 41 determines whether or not the main catalyst 9 reaches the catalytic activation temperature based on the detection temperature of the temperature sensor 10. When the temperature of the main catalyst 9 is not over the catalytic activation temperature, the heater-provided catalyst 8 is electrically energized and the solenoid valve 34 is also electrically energized so that the solenoid valve 34 opens. In FIG. 4, a battery 42 is loaded on an automobile.

The mode of effect of the above construction is described. In the following description, however, the driven shaft 22 and the driving shaft 23 is described as a main shaft 21 unless distinction of two shafts is required for description.

When the engine 1 starts, the electronic controller 41 obtains the detection signal from the temperature sensor 10. Based on the detection signal, the electronic controller 41 determines whether or not the temperature of the exhaust gas is over a predetermined temperature and the main catalyst 9 has the catalytic activation temperature. Since the engine 1 just starts, the temperature of the exhaust gas is still low and the temperature of the main catalyst 9 is lower than the catalytic activation temperature, the electronic controller 41 turns on the switch 40, electrically energizes the heater of the heater-provided catalyst 8 and electrically energizes the solenoid valve 34 so that the solenoid valve 34 opens.

Since the pressure of the chamber 31b of the diaphragm actuator 29 is negative by communicated with the intake manifold 36, the diaphragm 32 displaces in the direction indicated by the arrow C, and thereby the operating shaft 33 is moved in the same direction and rotates the main shaft 21 of the switching valve 4 in the direction indicated by the arrow A. The arm 24 rotates in the same direction, and thereby, as shown with the two-dotted line in FIG. 3, the opening and closing plate 27 opens the ventilation hole 15 (bypass pipe 7) and closes the main exhaust pipe 6. The heater-provided catalyst 8 is heated by the heater and the temperature thereof sharply rises and be in the catalytic activation state in an early stage.

Immediately after the start of the engine 1, since the bypass pipe 7 is opened, the exhaust gas from the engine 1 flows in the bypass pipe 7 by flowing from the exhaust manifold 2 through the casing 5 of the switching valve 4. When the exhaust gas passes through the header-provided catalyst 8 at the catalytic activation temperature, HC, CO, NOx or the like is removed from the exhaust gas by the heater-provided catalyst 8 due to the oxidation or reduction reaction. The exhaust gas purified by the heater-provided catalyst 8 flows into the main exhaust pipe 6 and is discharged into the air through the main catalyst 9.

The exhaust gas itself holds the heat generated by the combustion inside the engine 1. Further, when the exhaust gas passes through the heater-provided catalyst 8, the exhaust gas is heated by the heater and also heated by a reaction heat due to the oxidation or the reduction reaction of the toxic gas components described above. Furthermore, when the exhaust gas passes through the main catalyst 9, the main catalyst 9 is heated by the heat of the exhaust gas, and therefore, the temperature of the main catalyst 9 gradually rises.

When the temperature of the main catalyst 9 is more than the catalytic activation temperature, the temperature of the exhaust gas passing through the main catalyst 9 is more than a predetermined temperature. The electronic controller 41 detects the temperature of the exhaust gas based on the detection signal from the temperature sensor 10. The switch 40 is turned off and the heater of the heater-provided catalyst 8 is shut off and the solenoid valve 34 is also shut off. By shutting off the solenoid valve 34, the diaphragm 32 of the diaphragm actuator 29 is displaced in the direction indicated by the arrow D by the resilient force of the compression spring 37. As a result, the operating shaft 33 moves in the same direction and rotates the main shaft 21 of the switching valve 4 in the direction indicated by the arrow B. Accordingly, the arm 24 rotates in the same direction, and thereby the opening and closing plate 27 opens the main exhaust pipe 6 and closes the ventilation hole 15 (bypass pipe 7).

The exhaust gas from the engine 1 flows into the main exhaust pipe 6 from the exhaust manifold 2 through the main casing portion 5a. When the exhaust gas passes through the main catalyst 9 in the catalytic activation state, HC, CO, NOx, or the like is removed from the exhaust gas by the main catalyst 9 with the oxidation or the reduction reaction and is discharged into the air.

The main shaft 21 of the switching valve 4 is provided inside the casing 5 constructing a portion of the exhaust portion 3. Since a window 25 is made at the housing 16, the driven shaft 22 is directly exposed to the exhaust gas passing through the casing cover 5b immediately after the engine 1 starts, and therefore, the temperature of the driven shaft 22 becomes high. However, in the embodiment, the main shaft 21 is divided into two segments, the driven shaft 22 and the driving shaft 23. Even though each of the driven shaft 22 and the driving shaft 23 is deformed into an arch shape by the heat, a total length of the driven shaft 22 and the driving shaft 23 in an axial direction is shorter than a length of the main shaft 21 without having segments, an arched deformation amount of the driven shaft 22 and driving shaft 23 is small. Furthermore, since the width of the slot 22b of the driven shaft 22 is wider than the width of the rib-shaped projection 23b of the driving shaft 23. Even though the driven 22 exposed entirely to the exhaust gas is largely deformed into the arch shaped, the driven shaft 22 displaces the axial center with respect to the driving shaft 23.

Thus, the driven shaft 22 does not rub the inner periphery of the bearing hole 17 or the driving shaft 23 does not rub the inner periphery of the bearing hole 19. The main exhaust pipe 6 and the ventilation hole 15 (bypass pipe 7) can exactly be opened and closed. Just after the engine 1 starts, some of the exhaust gas leaking into the main exhaust gas pipe 6 are not discharged into the air without being purified by the heater-provided catalyst 8.

Since the clearance C2 between the driven shaft 22 and the inner periphery of the bearing hole 17 is designed to be wider than the clearance C1 between the driving shaft 23 and the inner periphery of the bearing hole 19, the exhaust gas leaking through the clearance C1 into the air can be restrained to be extremely a little amount. Even though the clearance C1 is narrowed, since the driving shaft 23 is shorter than the driven shaft 22, the amount of the arch-shaped deformation of the driving shaft 23 is small. Moreover, since the driving shaft 23 is smaller in diameter than the driven shaft 22, even though a cross section of the driving shaft 23 is elliptically deformed, the amount of the deformation is less than that of the driven shaft 22. Therefore, the driving shaft 23 does not rub the inner periphery of the bearing hole 19. On the contrary, the driven shaft 22 is longer than the driving shaft 23, the amount of the arch-shaped deformation of the driven shaft 22 is larger than that of the driving shaft 23. Further, the driven shaft 22 is larger in diameter than the driving shaft 23. Therefore, since the clearance C2 is set to be large even though the amount of the arch-shaped deformation is larger than the amount of an elliptical deformation, the driven shaft 22 does not rub the inner periphery of the bearing hole 17.

Furthermore, the driven shaft 22 can move in the axial direction because of the presence of the clearance C3. Thus, even though the driven shaft 22 is extended in the axial direction due to a heat expansion, the flange portion 23a of the driving shaft 23 does not strongly hit the lower end of the sleeve 20.

As described above, since the clearance C1 can be narrowed without causing rotational movement malfunction of the driven shaft 22 and the driving shaft 23, the amount of the exhaust gas discharged into the air without being purified can be restrained to be small. Therefore, the purification ratio of the exhaust gas can be improved.

In the embodiment, since the heater-provided catalyst 8 is provided inside the bypass pipe 7, the exhaust gas can be purified by activating the heater-provided catalyst 8 within a short time from the start of the engine 1. In this case, the heater-provided catalyst 8 may be a start catalyst provided without a heater and having a small heat capacity, and the secondary air can be introduced to the catalyst.

The driven shaft 22 and the driving shaft 23 can be made of not only a stainless steel but also the other heat resistant material such as ceramics having a small heat strain or the like. Alternatively, the driven shaft 22 is made of a stainless steel while the driving shaft 23 is made of ceramics so that the clearance C1 can be made to be narrower. On the other hand, the driven shaft 22 can be made of ceramics while the driving shaft 23 can be made of a stainless steel. The main shaft 21 can also be divided into three segments.

The catalytic activation condition of the main catalyst 9 does not depend on the temperature of the exhaust gas after passing through the main catalyst 9. Alternatively, an operational conditions of the engine 1, for example, a rotational speed of the engine 1, an intake air flow rate, the negative pressure of the intake manifold 36, the water temperature of the engine 1, a concentration of oxygen and an air-fuel ratio, are inputted into the electronic controller 41. When the operational conditions become predetermined conditions, the catalytic activation condition of the main catalyst 9 can be determined.

Figure 5:
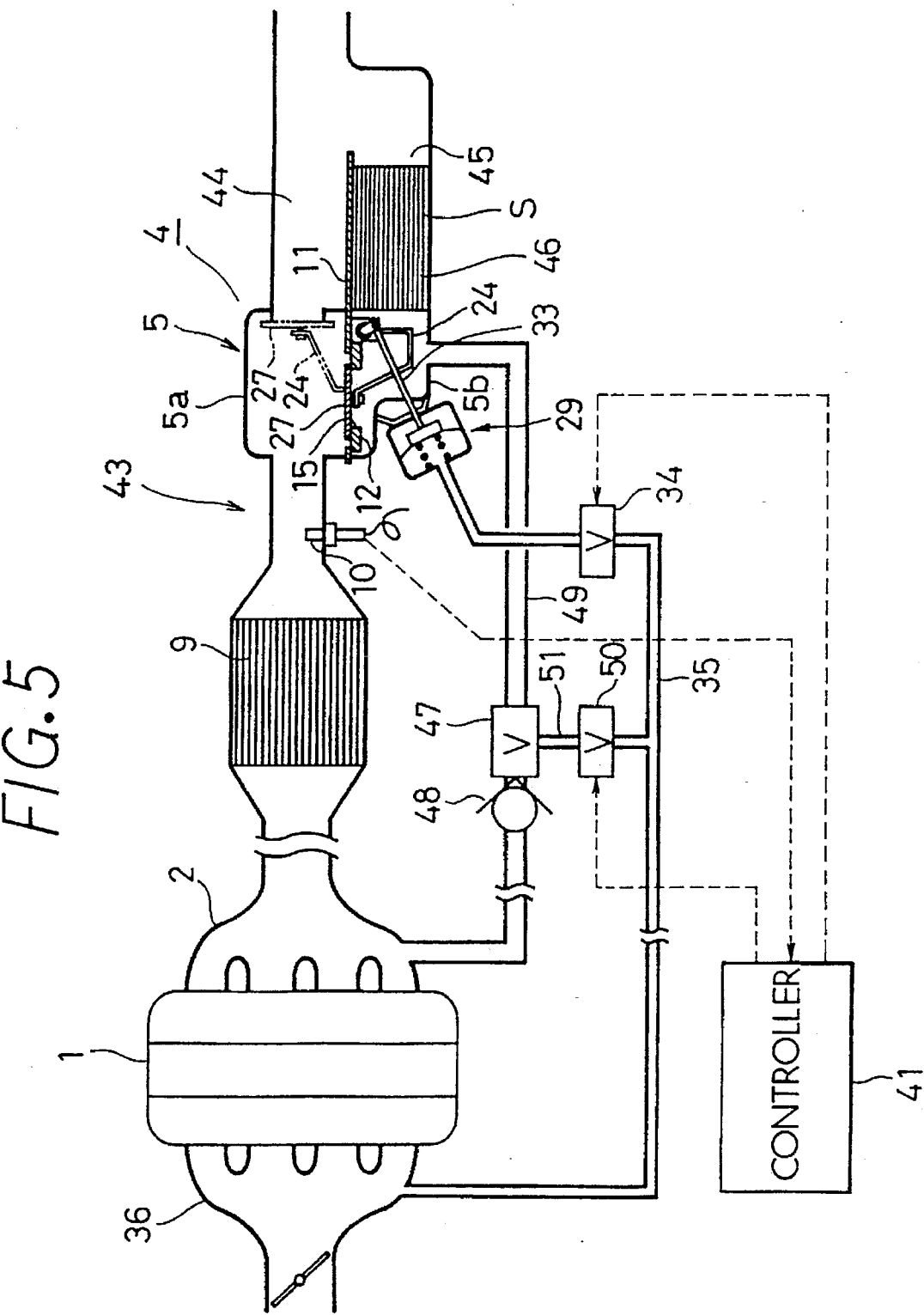
FIG. 5 is a view illustrating the construction of the exhaust gas purification system of a second embodiment according to the present invention.

A second embodiment of the present invention is explained with reference to FIG. 5. In FIG. 5, however, the same reference numerals as those in FIG. 4 is used for the identified portions and the description thereof is omitted, and only those portions being different from FIG. 4 is described.

At an exhaust pipe 43 connected to the exhaust manifold 2, the main catalyst 9 is provided. On the downstream side from the main catalyst 9, the switching valve 4 is connected to the exhaust pipe 43. The downstream side of the exhaust pipe 43 from the switching valve 4 is divided into a main flow passage 44 and a bypass flow passage 45 by extending the frame plate 11. The bypass flow passage 45 joins the main flow passage 44 on the downstream side of the exhaust pipe 43. In FIG. 5, the exhaust pipe 43 is indicated by being cut off at the intermediate portion thereof. Thus, the exhaust pipe 43 is sufficiently long from the exhaust manifold 2 to the main catalyst 9 so that the main catalyst 9 is protected from being exposed to the high-temperature exhaust gas emitted from the engine 1.

At the bypass flow passage 45, a carrier in which a toxic gas components such as HC or the like is adsorbed made of a stainless steel or ceramics such as cordierite or the like and formed into a honeycomb shape is disposed. For example, an adsorber 46 in which zeolite type adsorbent S is carried is disposed at the bypass flow passage 45. The casing cover 5b is connected to the exhaust manifold 2 through a reflux pipe 49 having an opening and closing valve 47 provided with a diaphragm actuator of a similar construction to the diaphragm actuator 29 and a one-way valve 48. The valve element of the opening and closing valve 47 is opened and closed by the operating shaft of the diaphragm actuator, the opening and closing valve 47 is connected to the intake pipe 35 through a pipe 51 having a solenoid valve 50, and the solenoid valve 50 is controlled by the electronic controller 41.

Next, the mode of operation of the above construction is described. Immediately after the engine 1 starts, since the temperature of the exhaust gas passed through the main catalyst 9 does not reach a predetermined temperature, the electronic controller 41 electrically energizes the solenoid valve 34 to activate the opening and closing panel 27 of the switching valve 4 to open the bypass flow passage 45 and close the main flow passage 44 as indicated by a two-dotted line in FIG. 5. Thus, the exhaust gas passed through the main catalyst 9 flows into the bypass flow passage 45, is purified by adsorbing the toxic gas components in the exhaust gas in the adsorbent S, and is discharged into the air.

When the main catalyst 9 is heated by the exhaust gas to the catalytic activation temperature, the electronic controller 41 detects the temperature based on the detection signal by the temperature sensor 10. Therefore, the solenoid valve 34 is shut off and the main flow passage 44 is opened by the opening and closing panel 27 of the switching valve 4. The bypass flow passage 45 is closed in the same way as described above and the opening and closing valve 47 is opened by electrically energizing the solenoid valve 50.

Subsequently, when the exhaust gas passes through the main catalyst 9 in the catalytically activated state, the exhaust gas is purified therein and discharged into the air through the main flow passage 44. After the temperature of the main catalyst 9 reaches the catalytic activation temperature, the temperature of the exhaust gas just after passing through the main catalyst 9 is also considerably high. Hence, the adsorber 46 is heated by the exhaust gas passing through the main flow passage 44 through the frame panel 11 as a partition and the temperature of the adsorber 46 rises. The adsorbent S starts desorbing the toxic gas components of the exhaust gas, and the desorbed toxic gas components are sucked into the exhaust manifold 2 through the reflux pipe 49. Although the pressure in the exhaust manifold 2 pulsate by a rise of a plurality of pistons of the engine 1, the pressure of the exhaust gas flowing through the main passage 44 is averaged without pulsation. Thus, when the pressure in the exhaust manifold 2 is lower than the pressure of the exhaust gas in the main flow passage 44 due to the pulsation, the desorbed toxic gas components are sucked into the exhaust manifold 2. At that time, even though the pressure in the exhaust manifold 2 is higher than the pressure in the main flow passage 44 due to the pulsation, by a checking operation of the one-way valve 48, the exhaust gas does not flow into the bypass flow passage 45 through the reflux pipe 49. The toxic gas components sucked into the exhaust manifold 2 as described above are purified while passing through the main catalyst 9.

According to the present embodiment, since the toxic gas components are adsorbed by the adsorbent S before the main catalyst 9 is activated and an adsorbing operation is effective upon the start of the engine 1, the purification ratio of the exhaust gas can be improved further.

In order to facilitate the detachment of the toxic gas components of the exhaust gas when the temperature of the main catalyst 9 reaches the catalytic activation temperature, a hole is made in the frame panel 11 separating the main flow passage 44 from the bypass flow passage 45 so that a side of the adsorbent S can be directly exposed to the exhaust gas. Therefore, a heat transfer from the exhaust gas to the adsorbent S is carried out efficiently.

Furthermore, the required time for the adsorbent S to desorb the toxic gas components is measured by an experiment beforehand and the required time is stored in the electronic controller 41. Therefore, the solenoid valve 50 and the opening and closing valve 47 are closed within the required time period.

Figure 6:
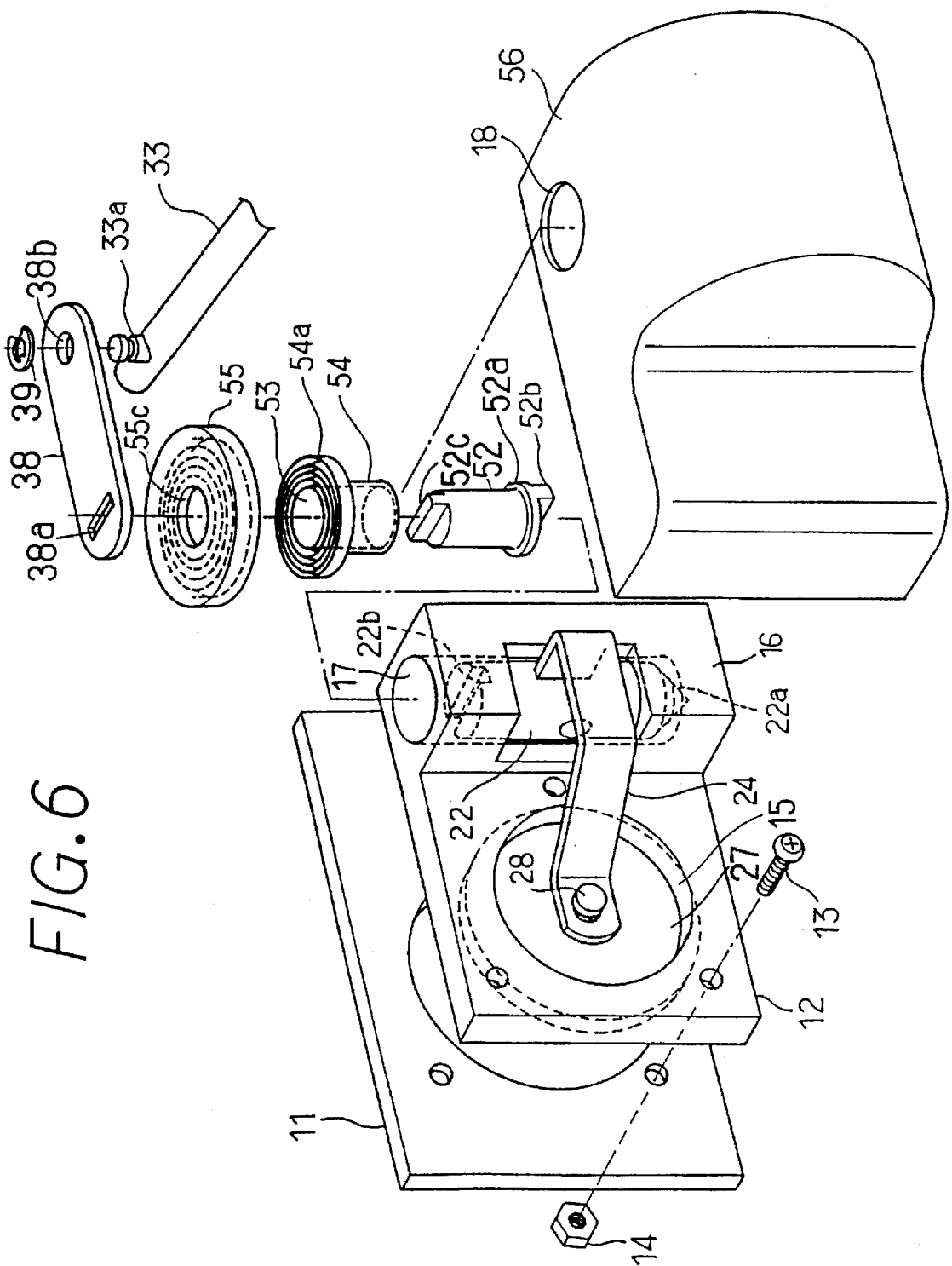
FIG. 6 is an exploded perspective view illustrating the main portion of a third embodiment according to the present invention.
Figure 7:
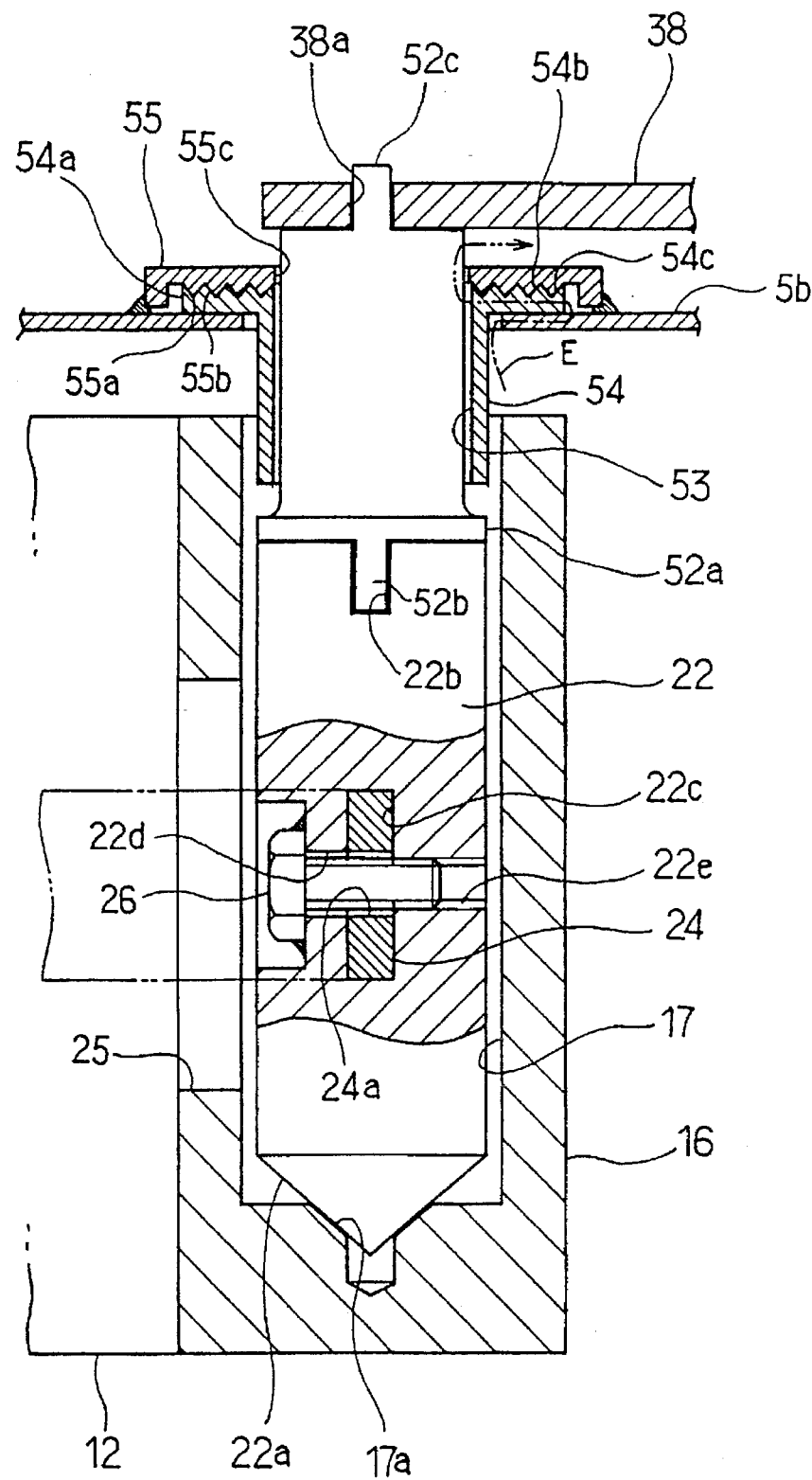
FIG. 7 is a partial vertical cross-sectional view illustrating the main portion.

FIGS. 6 and 7 illustrate a third embodiment of the present invention. In FIGS. 6 and 7, the same reference numerals as those of FIGS. 1 and 2 are used for the identified portions and only those portions different from FIGS. 1 and 2 are described.

In this embodiment, the driving shaft of the main shaft of the switching valve is made of ceramics and a sleeve as a receiving member (bearing) having a hole into which the driving shaft is inserted, that is, a bearing hole, is made of ceramics.

That is, the driven shaft 22 is made of a stainless steel. A driving shaft 52 having a flange portion 52a and a sleeve 54 having a bearing hole 53 can be made of ceramics, for example, silicon nitride formed by sintering and having enough strength at high temperatures.

A rib-shaped projection 52b projecting from the lower surface portion of the driving shaft 52 is fitted in the slit 22b of the driven shaft 22. A rib-shaped projection 52c projecting from the upper surface portion of the driving shaft 52 is fitted in the square hole 38a of the link 38.

The sleeve 54 is loaded on the outer surface of the casing cover 5b so as to insert the driving shaft 52 into the bearing hole 53. At the sleeve 54, a metallic cover 55 with a flat circular container shape as a mounting member is covered. A periphery portion of the cover 55 is fixed at the casing cover 5b by welding. By welding the cover 55, the ceramic sleeve 54 is pressed to the casing cover 5b and is fixed thereat.

At the upper surface portion of a flange portion 54a of the sleeve 54 and at the inner upper surface portion of the cover 55, for example, annular projections 54b and 55a having cross sections of triangular shapes and annular concave portions 54c and 55b are alternatively formed. The annular projection 54b and annular concave portion 54c of the flange portion 54a and the annular concave portion 55b and annular projection 55a of the cover 55 are fitted together to form a labyrinth seal.

According to the present embodiment constructed as described above, since the driving shaft 52 and the sleeve 54 are formed by ceramics having a small heat strain, the clearance between the driving shaft 52 and the inner periphery of the bearing hole 53 can be extremely narrowed, and thereby the leak of the exhaust gas from the clearance can be prevented effectively. Furthermore, since both the driving shaft 52 and the sleeve 54 are small in heat strain, even though the clearance therebetween is small, the driving shaft 52 does not rub the inner periphery of the bearing hole 53. Therefore, the smooth opening and closing operation of the opening and closing panel 27 can be guaranteed. In FIG. 7, the clearance between the driving shaft 52 and the inner periphery of the bearing hole 53 is illustrated exaggeratedly.

Moreover, without making all the components of the switching valve 4 with ceramics having high manufacturing cost, only the driving shaft 52 and the sleeve 54 are made of ceramics so as to minimize the clearance between the driving shaft 52 and the inner periphery of the bearing hole 53 directly causing the leak of the exhaust gas to the outside. Therefore, the manufacturing cost can be minimized.

Since the sleeve 54 is mounted by the welding the cover 55 to the casing cover 5b, the ceramic sleeve 54 can easily be mounted at the casing cover 5b. In this case, the sleeve 54 is not directly welded to the casing cover 5b and the casing cover 5b made of metal, specifically a sheet metal, is low in flatness and a clearance between the casing cover 5b and the flange portion 54a of the sleeve 54 can be produced. Therefore, as shown in FIG. 7 by an arrow E with a two-dotted line, the exhaust gas flows between the flange portion 54a of the sleeve 54 and the casing cover 5b and between the outer periphery and the upper surface of the flange portion 54a of the sleeve 54 and the inner periphery and the inner upper surface of the cover 55, and the exhaust gas may leak from a hole 55c in which the driving shaft 42 is formed at the cover 55 so as to project outwardly. However, according to the present embodiment, the labyrinth seal is formed with the annular projection 54b and annular concave portion 54c of the flange portion 54a of the sleeve 54 and the annular projection 55a and annular concave portion 55b of the cover 55. Therefore, the exhaust gas can be effectively presented from leaking through the above-described route.

Figure 8:
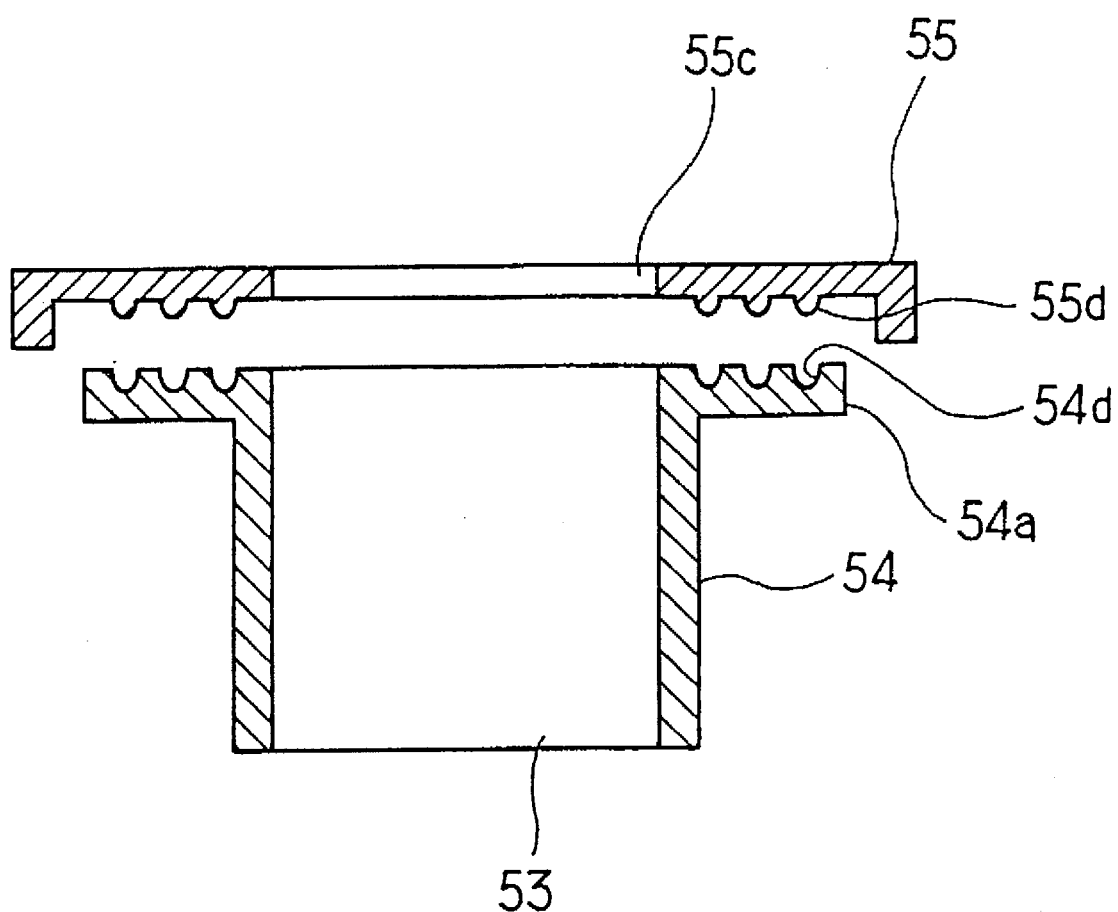
FIG. 8 is a cross-sectional view illustrating a construction of another labyrinth seal.

As shown in FIG. 8, the labyrinth seal may also be formed by fitting an annular concave portion 54d having a semicircular cross section and formed on the upper surface portion of the flange portion 54a of the sleeve 54 and an annular projection 55d having a semicircular cross section and projecting from the upper surface portion of the inner portion of the cover 55.

Figure 9:
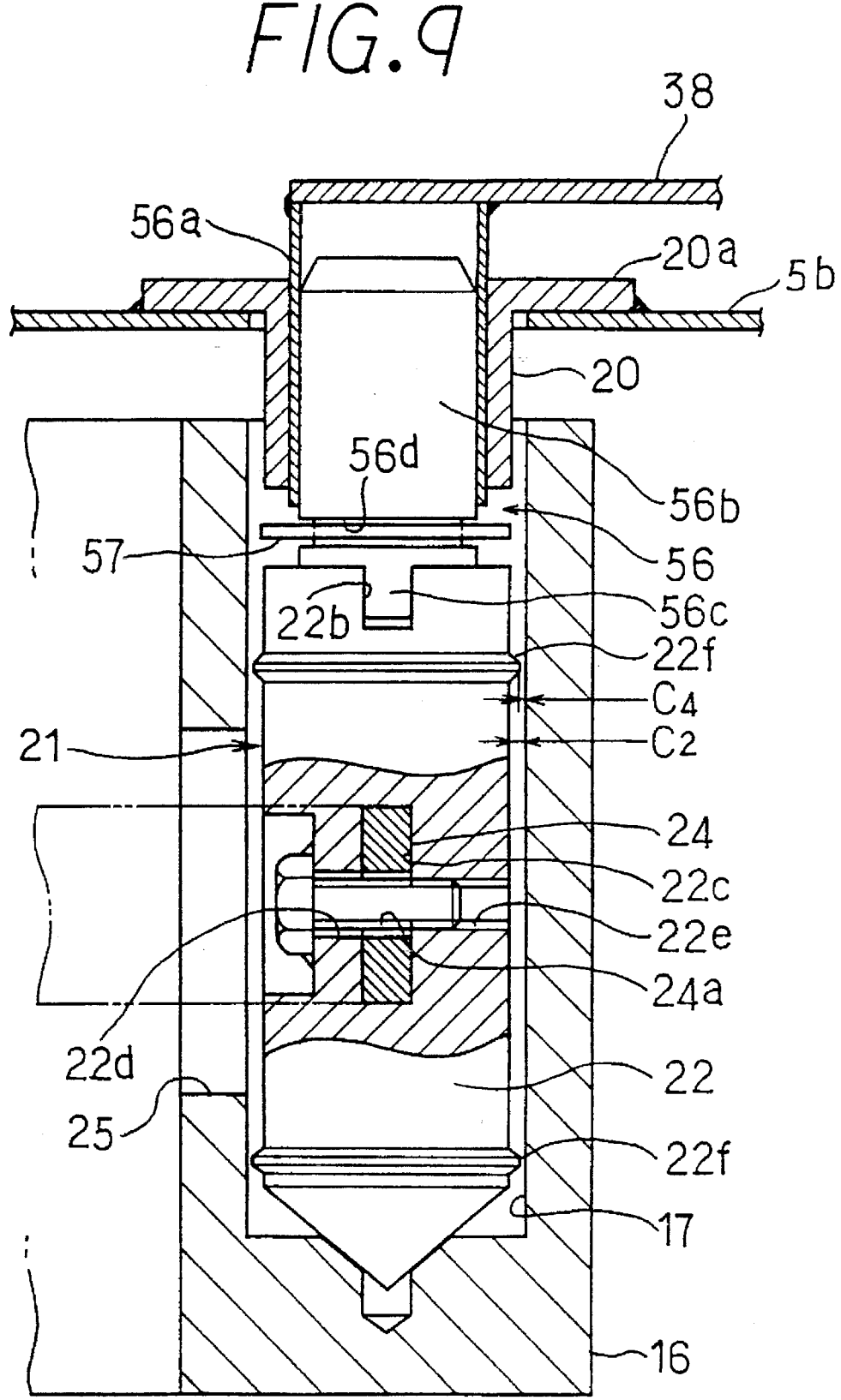
FIG. 9 is a partial vertical cross-sectional view illustrating the main portion of a fourth embodiment according to the present invention.
Figure 10:
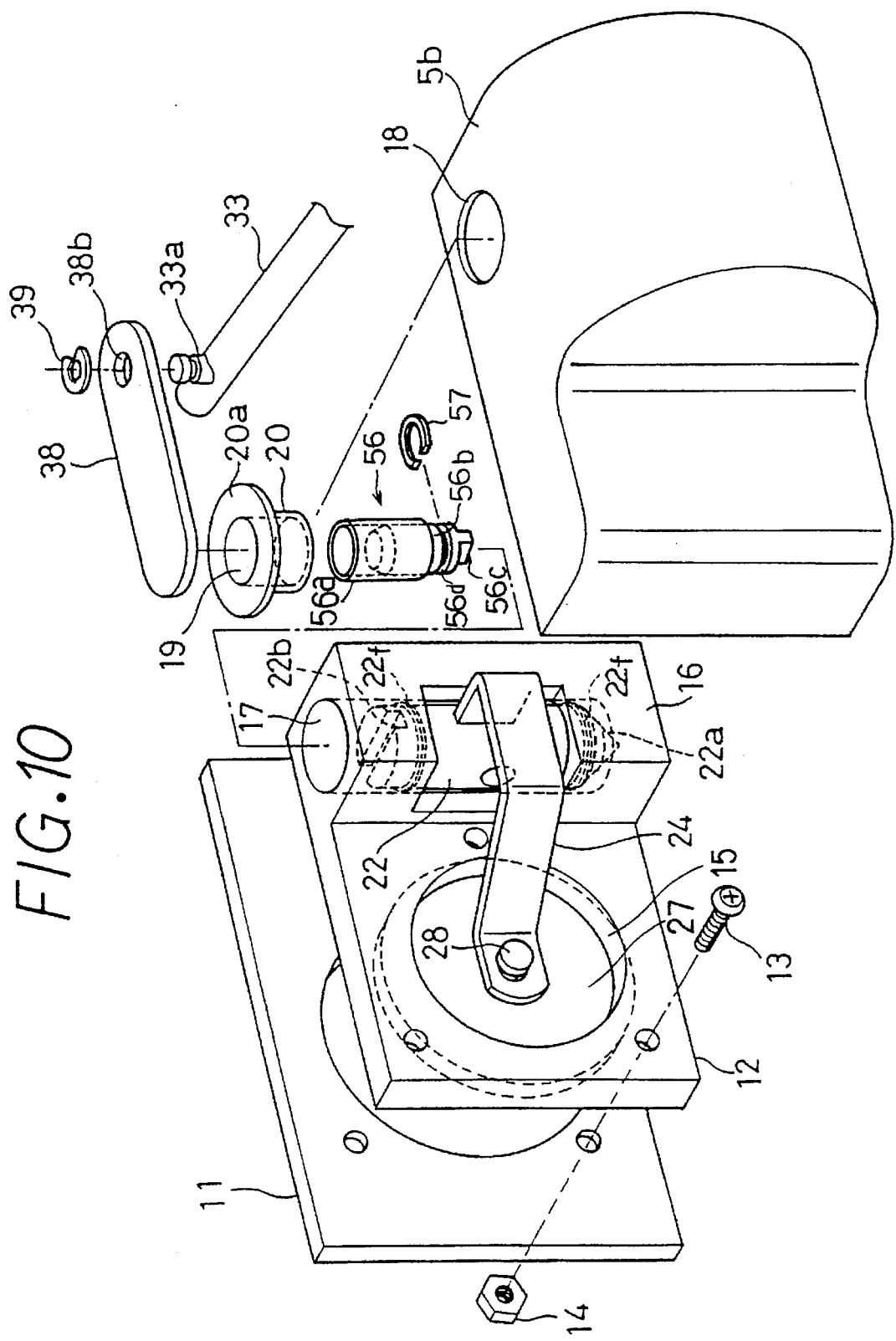
FIG. 10 is an exploded perspective view illustrating the main portion equivalent to FIG. 2.

FIGS. 9 and 10 illustrate a fourth embodiment of the present invention. In FIGS. 9 and 10, the same reference numerals are used for the identical portions of FIGS. 1 and 2 and only those portions different from those of FIGS. 1 and 2 are described.

In the present embodiment, the driving shaft of the main shaft of the switching valve is formed with a metallic shaft (for example, a stainless steel shaft) and a ceramic shaft (for example, a silicon nitride shaft).

That is, the driven shaft 22 of the main shaft 21 is made of stainless steel as is the case with the first embodiment, while a driving shaft 56 is formed with a ceramic shaft 56b pressed into a stainless steel shaft 56a. The stainless steel shaft 56a is fixed at the link 38 by welding.

At the driving shaft 56, as is the case with the first embodiment, a rib-shaped projection 56c projecting from the lower surface portion of the driving shaft 56 is fitted in the slit 22b of the driven shaft 22.

According to the present invention, in order to prevent the detachment of the driven shaft 22 and the driving shaft 56, a trench 56d into which a ring 57 is inserted is made at the ceramic shaft portion 56b of the driving shaft 56 projecting downward from the sleeve 20. The ring 57 is larger in diameter than the sleeve 20 so as to prevent the detachment of the main shaft 21 while being set in the housing 16.

Furthermore, the sleeve 20 is mounted on the outer surface of the casing cover 5b so that the driving shaft 56 is inserted into the bearing hole 19. The flange portion 20a of the sleeve 20 is fixed at the casing cover 5b by welding.

Further, at the driven shaft 22, in order to improve the coaxiality, a coaxiality adjusting ring 22f which protrudes around the outer periphery of the driven shaft is provided. Since the clearance C4 of the coaxiality adjusting ring 22f is smaller than the clearance C2 of the driven shaft 22, the coaxiality of the driven shaft 22 and the housing 16 is improved. Moreover, since a position of the coaxiality adjusting ring 22f is limited to a portion of the upper and the lower portions of the driven shaft 22, the driven shaft 22 does not contact entirely with the inner face by the arched deformation of the driven shaft 22.

According to the present embodiment constructed as above, the driving shaft 56 has the ceramic shaft portion 56b having a small heat strain. Therefore, even though the outside shaft 56a of the driving shaft 56 is made of a stainless steel, only a torsion force from the external driving equipment 29 is transmitted to the driven shaft 22, and thereby the shaft deformation is hard to be caused. Furthermore, when the material of the sleeve 20 is changed to a stainless steel having an equivalent coefficient of a linear thermal expansion and the material of the link 38 is also changed to a stainless steel, the flange portion 20a and the casing cover 5b and the outside shaft 56a and link 38 can be fixed only by welding. Accordingly, the manufacturing cost can be minimized.

By minimizing the clearance between the bearing hole 19 and the stainless steel shaft 56a, the leak of the exhaust gas can be prevented effectively and rubbing are not produced.

Furthermore, since the sleeve 20 is directly welded at the casing cover 5b, the exhaust gas from the peripheral portion 20a can be prevented.

What is claimed is:

1. An exhaust pipe opening and closing apparatus provided in an exhaust pipe of an automotive engine having a main flow passage and a bypass flow passage, driven by an external driving equipment provided on an outside of said exhaust pipe and selectively opening and closing said main flow passage and said bypass flow passage, said exhaust pipe opening and closing apparatus comprising:

a main shaft rotatably supported and reciprocatively rotated by said external driving equipment, one end portion of said main shaft projecting outwardly from said exhaust pipe to said external driving equipment and connected to said external driving equipment; and an opening and closing member provided on said main shaft and selectively opening and closing said main flow passage and said bypass flow passage corresponding to said reciprocative rotation of said main shaft, wherein said main shaft is divided into two segments composed of a driving shaft projected outwardly from said exhaust pipe and connected to said external driving equipment and a driven shaft positioned inside of said exhaust pipe, and said exhaust pipe opening and closing apparatus has a clearance between said driving shaft and an inner periphery of a hole into which said driving shaft is inserted, and said clearance is set to be narrower than a clearance between said driven shaft and an inner periphery of a hole into which said driven shaft is inserted.

2. The exhaust pipe opening and closing apparatus according to claim 1, wherein said driving shaft is shorter than said driven shaft in said axial direction.

3. The exhaust pipe opening and closing apparatus according to claim 2, wherein said driving shaft is smaller in a diameter than said driven shaft.

4. The exhaust pipe opening and closing apparatus according to claim 1, wherein said driven shaft is provided movably in said axial direction.

5. The exhaust pipe opening and closing apparatus according to claim 1, comprising a receiving member having said hole into which said driving shaft is inserted, wherein said driving shaft and said receiving member are made of ceramics and said receiving member is mounted in said exhaust pipe through a metallic mounting member.

6. The exhaust pipe opening and closing apparatus according to claim 1, comprising a receiving member having said hole into which said driving shaft is inserted, wherein said driving shaft is formed with a ceramic shaft and a metallic shaft; and said ceramic shaft is pressed into said metallic shaft and said receiving member is formed of a metal.

7. The exhaust pipe opening and closing apparatus according to claim 1, wherein said main flow passage has a main catalyst therein and said bypass flow passage has a heater-provided catalyst therein.

8. The exhaust pipe opening and closing apparatus according to claim 1, wherein one of said driving shaft and said driven shaft has a protruding portion and the other of said driving shaft and said driven shaft has a slot portion engaging with said protruding portion.

9. The exhaust pipe opening and closing apparatus according to claim 3, wherein said driven shaft has a coaxiality adjusting ring which protrudes around an outer periphery of said driven shaft.

10. The exhaust pipe opening and closing apparatus according to claim 8, wherein said driven shaft has two coaxiality adjusting ring which protrude around an outer periphery of said driven shaft at upper and lower portions of said driven shaft.

11. An exhaust pipe opening and closing apparatus provided in an exhaust pipe of an automotive engine having a main flow passage and a bypass flow passage, driven by an external driving equipment provided on an outside of said exhaust pipe and selectively opening and closing said main flow passage and said bypass flow passage, said main flow passage having a main catalyst therein, said bypass flow passage having a heater-provided catalyst, said exhaust pipe opening and closing apparatus comprising:

a main shaft rotatably supported and reciprocatively rotated by said external driving equipment, one end portion of said main shaft projecting outwardly from said exhaust pipe to said external driving equipment and connected to said external driving equipment;

an opening and closing member associated with said main shaft and selectively opening and closing said main flow passage and said bypass flow passage corresponding to said reciprocative rotation of said main shaft; and an arm member disposed on said main shaft for integrally moving said opening and closing member, wherein said main shaft is divided into two segments composed of a driving shaft projected outwardly from said exhaust pipe and connected to said external driving equipment and a driven shaft positioned inside of said exhaust pipe, said driven shaft has said arm member, and said exhaust pipe opening and closing apparatus has a clearance between said driving shaft and an inner periphery of a hole into which said driving shaft is inserted, and said clearance is set to be narrower than a clearance between said driven shaft and an inner periphery of a hole into which said driven shaft is inserted.

12. An exhaust pipe opening and closing apparatus provided in an exhaust pipe of an automotive engine having a main flow passage and a bypass flow passage, driven by an external driving equipment provided on an outside of said exhaust pipe and selectively opening and closing said main flow passage and said bypass flow passage, said main flow passage having a catalyst therein, said bypass flow passage having an adsorber for adsorbing toxic gas components in the exhaust gas, said exhaust pipe opening and closing apparatus comprising:

a main shaft rotatably supported and reciprocatively rotated by said external driving equipment, one end portion of said main shaft projecting outwardly from said exhaust pipe to said external driving equipment and connected to said external driving equipment;

an opening and closing member associated with said main shaft and selectively opening and closing said main flow passage and said bypass flow passage corresponding to said reciprocative rotation of said main shaft; and an arm member disposed on said main shaft for integrally moving said opening and closing member, wherein said main shaft is divided into two segments composed of a driving shaft projected outwardly from said exhaust pipe and connected to said external driving equipment and a driven shaft positioned inside of said exhaust pipe, said driven shaft has said arm member, and said exhaust pipe opening and closing apparatus has a clearance between said driving shaft and an inner periphery of a hole into which said driving shaft is inserted, and said clearance is set to be narrower than a clearance between said driven shaft and an inner periphery of a hole into which said driven shaft is inserted.

* * * * *